(12) United States Patent
Zhang et al.

(10) Patent No.: US 11,279,380 B2
(45) Date of Patent: Mar. 22, 2022

(54) METHOD AND APPARATUS FOR DETECTING AND AVOIDING COLLISION APPLIED TO VEHICLE

(71) Applicant: Apollo Intelligent Driving Technology (Beijing) Co., Ltd., Beijing (CN)

(72) Inventors: Lei Zhang, Beijing (CN); Kai Yang, Beijing (CN); Hongda Zhang, Beijing (CN); Wuzhao Zhang, Beijing (CN); Zhuo Chen, Beijing (CN); Baisheng Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/814,203

(22) Filed: Mar. 10, 2020

(65) Prior Publication Data

US 2021/0016798 A1    Jan. 21, 2021

(30) Foreign Application Priority Data

Jul. 17, 2019   (CN) .......................... 201910647517.2

(51) Int. Cl.
*B60W 60/00*    (2020.01)
*G05D 1/02*    (2020.01)
*G06K 9/00*    (2006.01)

(52) U.S. Cl.
CPC .... *B60W 60/0011* (2020.02); *B60W 60/0015* (2020.02); *G05D 1/0223* (2013.01); *G05D 1/0289* (2013.01); *G06K 9/00805* (2013.01); *G05D 2201/0213* (2013.01)

(58) Field of Classification Search
CPC ........ B60W 60/0011; B60W 60/0015; B60W 2710/10; B60W 2720/10; B60W 2554/00; B60W 2710/20; B60W 2710/18; B60W 50/023; B60W 30/09; B60W 30/095; G05D 1/0223; G05D 1/0289; G05D 2201/0213; G06K 9/00805
See application file for complete search history.

(56) References Cited

U.S. PATENT DOCUMENTS 9,229,453 B1    1/2016 Lee
2017/0123429 A1    5/2017 Levinson
(Continued)

FOREIGN PATENT DOCUMENTS

CN    108973990 A    5/2017
CN    108116405 A    6/2018
CN    108693878 A    10/2018
(Continued)

*Primary Examiner* — Rodney A Butler
(74) *Attorney, Agent, or Firm* — Knobbe, Martens, Olson & Bear LLP

(57) ABSTRACT

Embodiments of the present disclosure provide a method for detecting and avoiding a collision applied to a vehicle which determines a first path according to a real-time vehicle status. The method can include: S1) predefining a second path according to the real-time vehicle status; S2) determining whether the current first path is at risk of a collision, and determining whether the current second path is at risk of a collision; and S3) controlling the vehicle with an apparatus using a method for avoiding a collision, in a case where the current first path is at risk of a collision and/or the current second path is at risk of a collision.

12 Claims, 3 Drawing Sheets

(56) References Cited

U.S. PATENT DOCUMENTS

2017/0166204 A1 6/2017 Yoo
2019/0047580 A1* 2/2019 Kwasnick ............ G05D 1/0088

FOREIGN PATENT DOCUMENTS

| CN | 109664881 A | 4/2019 |
|----|-------------|--------|
| DE | 102014206338 A1 | 10/2015 |
| EP | 3495218 | 6/2019 |

* cited by examiner

METHOD AND APPARATUS FOR DETECTING AND AVOIDING COLLISION APPLIED TO VEHICLE

CROSS-REFERENCE TO RELATED APPLICATIONS

This application claims priority to Chinese Patent Application No. 201910647517.2, filed on Jul. 17, 2019, titled "Method and Apparatus for Detecting and Avoiding Collision Applied to Vehicle," which is hereby incorporated by reference in its entirety.

TECHNICAL FIELD

The present disclosure relates to the field of autonomous driving, in particular to a method for detecting and avoiding a collision applied to a vehicle, and an apparatus for detecting and avoiding a collision applied to a vehicle.

BACKGROUND

Autonomous driving is a complex system including modules such as sensor fusion module, positioning module, sensing module, planning module and control module. A problem of any one of the modules may result in a collision risk.

SUMMARY

An object of embodiments of the present disclosure is to provide a method for detecting and avoiding a collision applied to a vehicle, and an apparatus for detecting and avoiding a collision applied to a vehicle, so as to resolve the problem occurring in an autonomous driving process that a collision risk occurs since the collision detection device is not linked with the autonomous driving system, only performs a detection and does not take over the control of the vehicle.

To achieve above and other objects, in a first aspect of the disclosure, a method for detecting and avoiding a collision applied to a vehicle is provided, the vehicle determining a first path according to a real-time vehicle status, the method comprising:

S1) predefining a second path according to the real-time vehicle status;

S2) determining whether the current first path is at risk of a collision, and determining whether the current second path is at risk of a collision; and S3) controlling the vehicle by an apparatus using a method for avoiding a collision, in a case where the current first path is at risk of a collision and/or the current second path is at risk of a collision.

Optionally, in step S1), whether the current first path is at risk of a collision is determined and whether the current second path is at risk of a collision is determined by selecting a combination of one or more of following operations:

a vehicle status estimation, a braking time and braking distance estimation, an obstacle filtering, an obstacle tracking, a first path analysis, a safe distance calculation, an obstacle confidence calculation, a calculation of a distance to a most dangerous obstacle, a collision detection strategy assessment and a collision risk level assessment.

Optionally, in step S3), the vehicle is controlled by selecting a combination of one or more of following operations:

a safety risk analysis, a vehicle control right arbitration, a vehicle track point generation, a vehicle speed control, a vehicle steering control and a vehicle gear control.

Furthermore, the first path is a custom emergency path, and the second path is a secure takeover path.

Furthermore, the vehicle control right arbitration comprises: determining an actual vehicle control right arbitration module from N redundant vehicle control right arbitration modules by means of network aggregation and negotiation, to control the vehicle.

Furthermore, obtaining, by the N redundant vehicle control right arbitration modules, a message and a transmission delay of each other based on a CAN bus, and determine the actual vehicle control right arbitration module by means of network negotiation according to the message and the minimum transmission delay and a predefined priority of the N redundant vehicle control right arbitration modules.

In a second aspect of the disclosure, an apparatus for detecting and avoiding a collision applied to a vehicle is provided, the vehicle determining a first path according to a real-time vehicle status, the apparatus comprises a collision detection module and a collision avoidance module, the collision detection module and the collision avoidance module are configured for predefining a second path according to the real-time vehicle status, the collision detection module is further configured for determining whether the current first path is at risk of a collision, and determining whether the current second path is at risk of a collision, and the collision avoidance module is further configured for controlling the vehicle with a method for avoiding a collision, in a case where the current first path is at risk of a collision and/or the current second path is at risk of a collision.

Optionally, the collision detection module determines whether the current first path is at risk of a collision and determines whether the current second path is at risk of a collision by selecting a combination of one or more of following operations:

a vehicle status estimation, a braking time and braking distance estimation, an obstacle filtering, an obstacle tracking, a first path analysis, a safe distance calculation, an obstacle confidence calculation, a calculation of a distance to a most dangerous obstacle, a collision detection strategy assessment and a collision risk level assessment.

Optionally, the first path is a custom emergency path, and the second path is a secure takeover path.

Furthermore, the collision avoidance module controls the vehicle by selecting a combination of one or more of following operations:

a safety risk analysis, a vehicle control right arbitration, a vehicle track point generation, a vehicle speed control, a vehicle steering control and a vehicle gear control.

Furthermore, the vehicle control right arbitration comprises: determining an actual vehicle control right arbitration module from N redundant vehicle control right arbitration modules by means of network aggregation and negotiation, to control the vehicle.

Furthermore, the network aggregation and negotiation comprises: obtaining, by the N redundant vehicle control right arbitration modules, a message and a transmission delay of each other based on a CAN bus, and determine the actual vehicle control right arbitration module by means of network negotiation according to the message and the minimum transmission delay and a predefined priority of the N redundant vehicle control right arbitration modules.

In a third aspect of the disclosure, a machine-readable storage medium is provided, where an instruction is stored in the machine-readable storage medium, and the instruction, when executed by a controller, causes the controller to implement the method for detecting and avoiding a collision in above technical solution.

The technical solution of the present disclosure introduces, among other things, a collision detection module and a collision avoidance module, and enables, among other things, the collision detection module and the collision avoidance module to interact with a driving system of a vehicle, so as to increase the accuracy of collision risk detection. In addition, the collision avoidance module may take over the autonomous driving system, so as to ensure that the vehicle travels according to a safe trajectory, thereby avoiding a collision risk.

Other features and advantages of the embodiments of the present disclosure will be described in detail in the embodiments hereinafter.

BRIEF DESCRIPTION OF THE DRAWINGS

The accompanying drawings are used to provide a further understanding of the embodiments of the present disclosure, and constitute a part of the description. Together with the embodiments below, the accompanying drawings are used to explain the embodiments of the present disclosure, but not to limit the embodiments of the present disclosure. In the drawings.

DETAILED DESCRIPTION OF EMBODIMENTS

In the existing technology, whether there is a collision risk is determined using a separate collision detection device according to a distance between a current vehicle and a vehicle ahead, and the separate collision detection device is not linked with an autonomous driving system during the determination, thus the probability of misjudgment is high. In addition, the collision detection device only performs a detection but does not take over the control of the vehicle, which may cause a collision risk under actual road conditions, thus endangering the autonomous vehicle.

Embodiments of the present disclosure will be described below in detail with reference to the accompanying drawings. It should be appreciated that the specific embodiments described herein are merely used for explaining the present disclosure, rather than limiting the present disclosure.

Explanations of Technical Terms canbus: CAN (controller area network) bus;
canbus proxy: CAN bus proxy.

The present disclosure provides a method for detecting and avoiding a collision applied to a vehicle which determines a first path according to a real-time vehicle status, the method including:

S1) predefining a second path according to the real-time vehicle status;

S2) determining whether the current first path is at risk of a collision, and determining whether the current second path is at risk of a collision; and S3) controlling the vehicle by an apparatus using a method for avoiding a collision, in a case where the current first path is at risk of a collision and/or the current second path is at risk of a collision.

The first path is a custom emergency path, and the second path is a secure takeover path.

Figure 1:
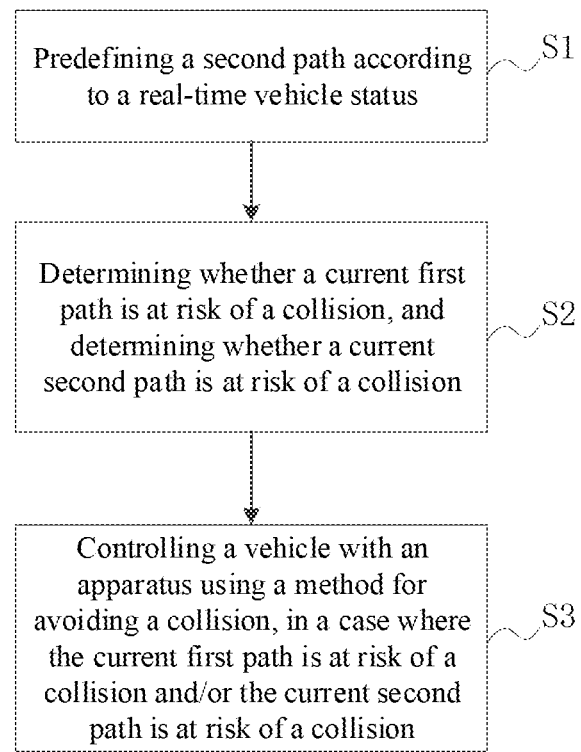
FIG. 1 is a flowchart of steps of a method for detecting and avoiding a collision applied to a vehicle according to an embodiment of the present disclosure.

Specifically, FIG. 1 is a flowchart of steps of a method for detecting and avoiding a collision applied to a vehicle according to an embodiment of the present disclosure. As shown in FIG. 1, a method for detecting and avoiding a collision applied to a vehicle is provided. A driving system of the vehicle customizes an emergency path according to a real-time vehicle status. The emergency path is updated in real time and is generated by an autonomous driving system itself. The method includes:

S1) A collision detection module and a collision avoidance module of the vehicle predefine a safe takeover path according to the real-time vehicle status. In the solution of the present disclosure, the collision detection module and the collision avoidance module are redundant systems of the vehicle, which are systems that coexist with the driving system of the vehicle. The collision detection module is configured for determining and detecting the real-time vehicle status of the vehicle, and the collision avoidance module predefines a safe takeover path for the current vehicle according to the determination and detection made by the collision detection module. The safe takeover path of the collision detection module and the collision avoidance module is updated in real time according to the current vehicle status and the collision detection module and the collision avoidance module are ready to take over the driving system of the vehicle, which plays a preventive role.

S2) For a vehicle in a driving state, the collision detection module determines whether the current driving emergency path is at risk of a collision, and determines whether the current safe takeover path is at risk of a collision. The collision detection module not only determines whether the custom emergency path of the current driving system is at risk, but also determines whether the safety takeover path made by the collision detection module and collision avoidance module which belong to redundant systems is at risk of a collision, which not only inspects the driving system but also inspects the collision avoidance module.

S3) When the current emergency path is at risk of a collision and/or the current safe takeover path is at risk of a collision, the collision avoidance module takes the place of the driving system to control the vehicle. During the inspection in step S2), if the emergency path generated by the driving system is at risk of a collision, or the safe takeover path made by the collision detection module and the collision avoidance module together is at risk of a collision, or both the emergency path and the safe takeover path are at risk of a collision, the collision avoidance module generates the latest safe takeover path according to the latest collision risk detected by the collision detection module, take place of the driving system to control the vehicle, and cancel the control of the driving system over the vehicle.

The collision detection module determines whether the current emergency path is at risk of a collision and determines whether the safe takeover path is at risk of a collision by selecting a combination of one or more of the following operations: a vehicle status estimation, a braking time and braking distance estimation, an obstacle filtering, an obstacle tracking, a custom emergency path analysis, a safe distance calculation, an obstacle confidence calculation, a calculation of a distance to the most dangerous obstacle, a collision detection strategy assessment and a collision risk level assessment.

The collision detection module determines a combination of the operations above according to the real-time status of the vehicle to determine whether the current emergency path is at risk of a collision and determines whether the safe takeover path is at risk of a collision. The collision detection module is a redundant part of the autonomous driving system. The function of such redundant part is equivalent to the detection and determination functions of the driving system itself, and is even more powerful than the detection and determination functions of the driving system itself to a certain extent. While the driving system performs its own determination of the emergency path, the collision detection module also performs a detection for a possible collision risk of the vehicle. The driving system and the collision detection module perform the determinations based on respective determination algorithms and do not affect each other.

For example, when there is no obstacle in front of the vehicle, the operations of the collision detection module include a vehicle status estimation, a braking time and braking distance estimation, a safe distance calculation, a collision detection strategy assessment and a collision risk level assessment. The operations above are performed in sequence, and finally a detection result is sent to the collision avoidance module.

When there is an obstacle in front of the vehicle, the operations of the collision detection module include an obstacle filtering, an obstacle tracking, a safe distance calculation, an obstacle confidence calculation, a calculation of a distance to the most dangerous obstacle, a collision detection strategy assessment and a collision risk level assessment. The operations above are performed in sequence, and finally a detection result is sent to the collision avoidance module.

The collision avoidance module controls the vehicle by selecting a combination of one or more of the following operations: a safety risk analysis, a vehicle control right arbitration, a vehicle track point generation, a vehicle speed control, a vehicle steering control and a vehicle gear control. The collision avoidance module controls the vehicle by means of a combination of the operations above.

The collision avoidance module is the acquirer of the ultimate control over the vehicle. Regardless of whether the collision risk detected by the collision detection module comes from the emergency path of the driving system or the safe takeover path generated by the collision detection module and the collision avoidance module, the collision avoidance module eventually takes over the vehicle and implement the safe takeover path.

Preferably, the collision avoidance module is a plurality of redundant collision avoidance modules. If the collision avoidance module finally takes over the autonomous vehicle, the collision avoidance module sends a control signal to a CAN bus located in a vehicle chassis.

The vehicle control right arbitration module is a part of the collision avoidance module. Since there are N redundant collision avoidance modules, there are also N vehicle control right arbitration modules. The reason for providing the N collision avoidance modules is that if one or more collision avoidance modules fail, the remaining collision avoidance modules may provide ultimate safety protection without any difference. The N redundant collision avoidance modules are connected by means of a network, and all are connected to the CAN bus.

The network aggregation and negotiation refer to: the N redundant vehicle control right arbitration modules obtain a message and a transmission delay of each other, and determine the actual vehicle control right arbitration module by means of network negotiation according to the message and the minimum transmission delay and a predefined priority of the N redundant vehicle control right arbitration modules.

First, the N redundant vehicle control arbitration modules cut off a control instruction issued by the autonomous driving system; then, the vehicle control arbitration module in each collision avoidance module issues a control instruction to a CAN bus proxy and applies for arbitration on a control right; N CAN bus proxies send healthy heartbeat messages to the CAN bus, and the N collision avoidance modules may receive a heartbeat message of each other; and then, the N redundant vehicle control right arbitration modules performs aggregation and negotiation through networks to obtain the optimal collision avoidance module according to the heartbeat messages in the CAN bus, transmission delay information and a predefined priority of the N redundant vehicle control right arbitration modules; control messages of non-optimal collision avoidance modules are discarded; and finally, a control message of the optimal collision avoidance module is sent to the CAN bus in the vehicle, so that the optimal collision avoidance module obtains control right over the vehicle.

In another aspect, the present disclosure further provides an apparatus for detecting and avoiding a collision applied to a vehicle, the vehicle determining a first path according to a real-time vehicle status, where the apparatus further includes a collision detection module and a collision avoidance module.

The collision detection module and the collision avoidance module are configured for predefining a second path according to the real-time vehicle status.

The collision detection module is further configured for determining whether the current first path is at risk of a collision, and determining whether the current second path is at risk of a collision.

The collision avoidance module is further configured for controlling the vehicle with a method for avoiding a collision, in a case where the current first path is at risk of a collision and/or the current second path is at risk of a collision.

The first path is a custom emergency path, and the second path is a secure takeover path.

Specifically, the present disclosure further provides an apparatus for detecting and avoiding a collision applied to a vehicle having a driving system, and the driving system customizes an emergency path according to a real-time vehicle status. The apparatus further includes a collision detection module and a collision avoidance module.

The collision detection module and the collision avoidance module are configured for predefining a safe takeover path according to the real-time vehicle status.

The collision detection module is further configured for determining whether the current driving emergency path is at risk of a collision, and determining whether the current safe takeover path is at risk of a collision.

The collision avoidance module is further configured for taking the place of the driving system to control the vehicle with a method for avoiding a collision, when the current emergency path is at risk of a collision and/or the current safe takeover path is at risk of a collision.

Figure 2:
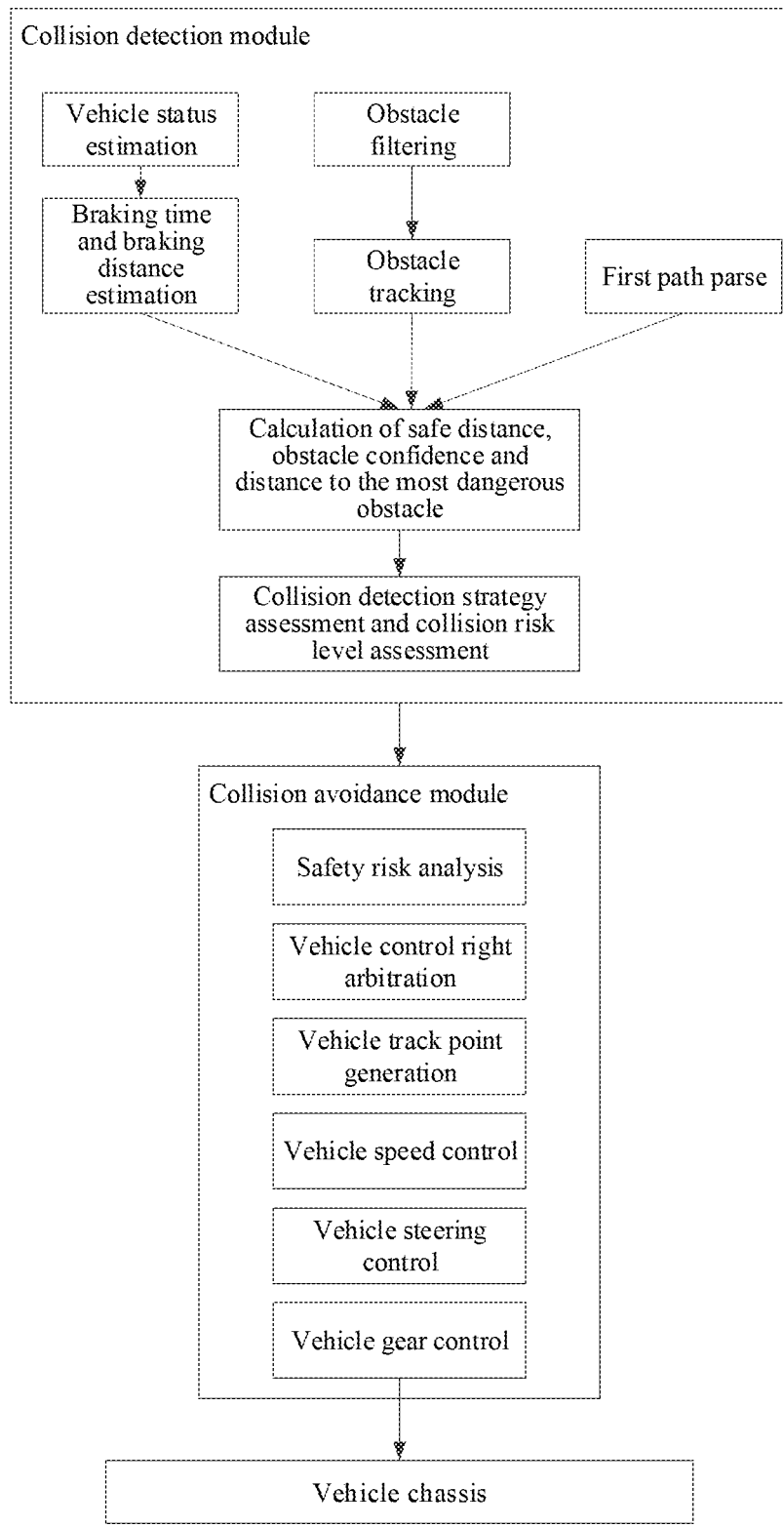
FIG. 2 is a configuration logic diagram of a collision detection module and a collision avoidance module in an apparatus for detecting and avoiding a collision applied to a vehicle according to an embodiment of the present disclosure.
Figure 3:
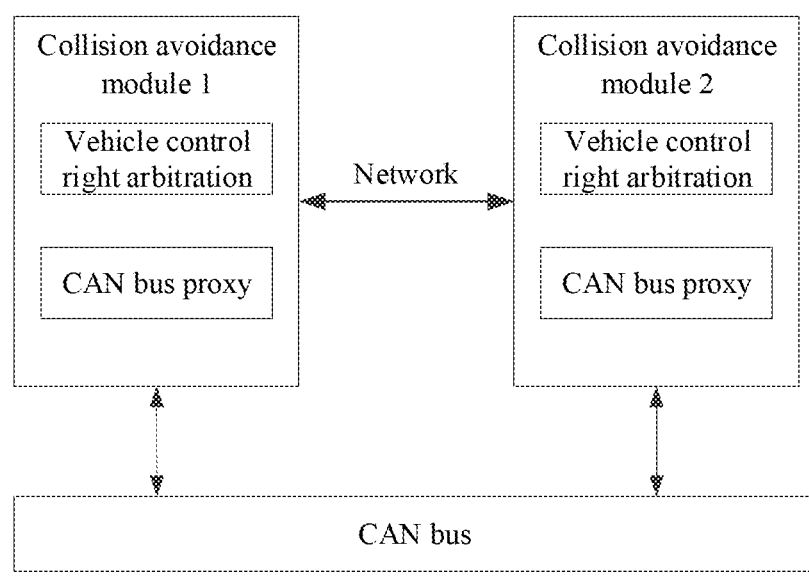
FIG. 3 is a schematic diagram illustrating relationships among multiple collision avoidance modules in the apparatus for detecting and avoiding a collision applied to a vehicle according to an embodiment of the present disclosure.

FIG. 2 is a configuration logic diagram of the collision detection module and the collision avoidance module in the apparatus for detecting and avoiding a collision applied to a vehicle according to an embodiment of the present disclosure.

The apparatus for detecting a collision includes at least one collision detection module, the collision avoidance module being a plurality of redundant collision avoidance modules.

Optionally, the collision detection module determines whether the current emergency path is at risk of a collision and determines whether the safe takeover path is at risk of a collision by selecting a combination of one or more of the following operations: a vehicle status estimation, a braking time and braking distance estimation, an obstacle filtering, an obstacle tracking, a customer emergency path analysis, a safe distance calculation, an obstacle confidence calculation, a calculation of a distance to the most dangerous obstacle, a collision detection strategy assessment and a collision risk level assessment.

Optionally, the collision avoidance module controls the vehicle by selecting a combination of one or more of the following operations: a safety risk analysis, a vehicle control right arbitration, a vehicle track point generation, a vehicle speed control, a vehicle steering control and a vehicle gear control.

Further, the vehicle control right arbitration is that an actual vehicle control right arbitration module is determined from N redundant vehicle control arbitration modules by means of network aggregation and negotiation, to control the vehicle.

Further, the network aggregation and negotiation are as follows: the N redundant vehicle control arbitration modules obtain a message and a transmission delay of each other, and determine the actual vehicle control right arbitration module by means of network negotiation according to the message and the minimum transmission delay and a predefined priority of the N redundant vehicle control right arbitration modules.

In a third aspect of the present disclosure, a machine-readable storage medium is further provided, where an instruction is stored in the machine-readable storage medium, and the instruction, when executed by a controller, causes the controller to implement the method for detecting and avoiding a collision.

In the technical solution of the embodiments of the present disclosure, the vehicle is configured with a collision detection module and a collision avoidance module that coexist with a driving system, and the collision detection module and the collision avoidance module are enabled to interact with the driving system of the vehicle, which may play the effect of redundant systems well. Such modules not only inspect a custom emergency path of the driving system, but also define a safe takeover path based on a real-time vehicle status. When the emergency path of the driving system and/or the safe takeover path defined by the collision detection module and the collision avoidance module are at risk of a collision, the collision avoidance module may respond in time and interrupt the control of the driving system over the vehicle. Furthermore, N redundant collision avoidance modules are provided, which may also ensure that if one or more collision avoidance modules fail, the remaining collision avoidance modules may effectively take over the driving system and provide ultimate safety protection without any difference, thereby preventing the vehicle from collision.

The optional implementations of some embodiments of the present disclosure have been described above in detail with reference to the accompanying drawings. However, the embodiments of the present disclosure are not limited to the specific details in the foregoing implementations. Within the scope of the technical concept of the embodiments of the present disclosure, the technical solution in the embodiments of present disclosure may be subject to various simple modifications, and such simple modifications all belong to the scope of protection of the embodiments of the present disclosure.

It should be also noted that the specific technical features described in the above embodiments may be combined with each other in any suitable method on a non-conflict basis. In order to avoid unnecessary repetition, the embodiments of the present disclosure do not separately describe various possible combinations.

Those skilled in the art may understand that all or part of the steps of implementing the method embodiments may be completed by using a program to instruct related hardware. The program is stored in a storage medium including instructions to enable a microcontroller, a chip, or a processor to execute all or part of the steps of the method described in the embodiments of the present disclosure. The storage medium includes a U disk, a mobile hard disk, a read-only memory (ROM), a random access memory (RAM), a magnetic disk, or an optical disk and other media that may store program codes.

In addition, any combination of various implementations of the embodiments according to the present disclosure may be made as long as the same does not deviate from the idea of the embodiments of the present disclosure, and such combination should be regarded as a content disclosed by the embodiments of the present disclosure.

What is claimed is:

1. A method for detecting and avoiding a collision applied to a vehicle, the vehicle determining a first path according to a real-time vehicle status, the method comprising:
   S1) predefining a second path according to the real-time vehicle status;
   S2) determining whether the current first path is at risk of the collision, and determining whether the current second path is at risk of the collision; and
   S3) controlling the vehicle by an apparatus using a method for avoiding the collision in response to determining that the current first path is at risk of the collision and/or the current second path is at risk of the collision, wherein the vehicle is controlled by a vehicle control right arbitration, wherein the vehicle control right arbitration comprises: determining an actual vehicle control right arbitration module from N redundant vehicle control right arbitration modules by means of network aggregation and negotiation, to control the vehicle, and
   wherein the network aggregation and negotiation comprise: obtaining, by the N redundant vehicle control right arbitration modules, a message and a transmission delay of each other based on a CAN bus, and determine the actual vehicle control right arbitration module by means of network negotiation according to the message and the minimum transmission delay and a predefined priority of the N redundant vehicle control right arbitration modules.

2. The method according to claim 1, wherein in step S1), whether the current first path is at risk of the collision and whether the current second path is at risk of the collision are determined by selecting a combination of one or more of following operations:
a vehicle status estimation, a braking time and braking distance estimation, an obstacle filtering, an obstacle tracking, a first path analysis, a safe distance calculation, an obstacle confidence calculation, a calculation of a distance to a most dangerous obstacle, a collision detection strategy assessment or a collision risk level assessment.

3. The method according to claim 1, wherein the first path is a custom emergency path, and the second path is a secure takeover path.

4. The method according to claim 1, wherein in step S3), the vehicle is further controlled by selecting a combination of one or more of following operations:
a safety risk analysis, a vehicle track point generation, a vehicle speed control, a vehicle steering control or a vehicle gear control.

5. An apparatus for detecting and avoiding a collision applied to a vehicle, the vehicle determining a first path according to a real-time vehicle status, wherein the apparatus comprises:
at least one processor; and
a memory storing instructions, wherein the instructions, when executed by the at least one processor, cause the at least one processor to perform operations, the operations comprising:
predefining a second path according to the real-time vehicle status;
determining whether the current first path is at risk of the collision, and determining whether the current second path is at risk of the collision; and
controlling the vehicle with a method for avoiding the collision in response to determining that the current first path is at risk of the collision and/or the current second path is at risk of the collision, wherein the vehicle is controlled by a vehicle control right arbitration, wherein the vehicle control right arbitration comprises: determining an actual vehicle control right arbitration module from N redundant vehicle control right arbitration modules by means of network aggregation and negotiation, to control the vehicle, and
wherein the network aggregation and negotiation comprise: obtaining, by the N redundant vehicle control right arbitration modules, a message and a transmission delay of each other based on a CAN bus, and determine the actual vehicle control right arbitration module by means of network negotiation according to the message and the minimum transmission delay and a predefined priority of the N redundant vehicle control right arbitration modules.

6. The apparatus according to claim 5, wherein whether the current first path is at risk of the collision and whether the current second path is at risk of the collision are determined by selecting a combination of one or more of following operations:
a vehicle status estimation, a braking time and braking distance estimation, an obstacle filtering, an obstacle tracking, a first path analysis, a safe distance calculation, an obstacle confidence calculation, a calculation of a distance to a most dangerous obstacle, a collision detection strategy assessment or a collision risk level assessment.

7. The apparatus according to claim 5, wherein the first path is a custom emergency path, and the second path is a secure takeover path.

8. The apparatus according to claim 5, wherein the vehicle is further controlled by selecting a combination of one or more of following operations:
a safety risk analysis, a vehicle track point generation, a vehicle speed control, a vehicle steering control or a vehicle gear control.

9. A non-transitory machine-readable storage medium storing instructions, wherein the instructions, when executed by a controller, cause the controller to implement operations, the operations comprising:
predefining a second path according to a real-time vehicle status;
determining whether a current first path determined by a vehicle according to the real-time vehicle status is at risk of a collision, and determining whether the current second path is at risk of the collision; and
controlling the vehicle with a method for avoiding the collision in response to determining that the current first path is at risk of the collision and/or the current second path is at risk of the collision, wherein the vehicle is controlled by a vehicle control right arbitration, wherein the vehicle control right arbitration comprises: determining an actual vehicle control right arbitration module from N redundant vehicle control right arbitration modules by means of network aggregation and negotiation, to control the vehicle, and
wherein the network aggregation and negotiation comprise: obtaining, by the N redundant vehicle control right arbitration modules, a message and a transmission delay of each other based on a CAN bus, and determine the actual vehicle control right arbitration module by means of network negotiation according to the message and the minimum transmission delay and a predefined priority of the N redundant vehicle control right arbitration modules.

10. The machine-readable storage medium according to claim 9, wherein whether the current first path is at risk of the collision and whether the current second path is at risk of the collision are determined by selecting a combination of one or more of following operations:
a vehicle status estimation, a braking time and braking distance estimation, an obstacle filtering, an obstacle tracking, a first path analysis, a safe distance calculation, an obstacle confidence calculation, a calculation of a distance to a most dangerous obstacle, a collision detection strategy assessment or a collision risk level assessment.

11. The machine-readable storage medium according to claim 9, wherein the first path is a custom emergency path, and the second path is a secure takeover path.

12. The machine-readable storage medium according to claim 9, wherein the vehicle is further controlled by selecting a combination of one or more of following operations:
a safety risk analysis, a vehicle track point generation, a vehicle speed control, a vehicle steering control or a vehicle gear control.

* * * * *